Oct. 31, 1972     A. R. TURNER     3,701,613
BUILDING FRAME BRACKETS
Filed Sept. 14, 1970     2 Sheets-Sheet 1
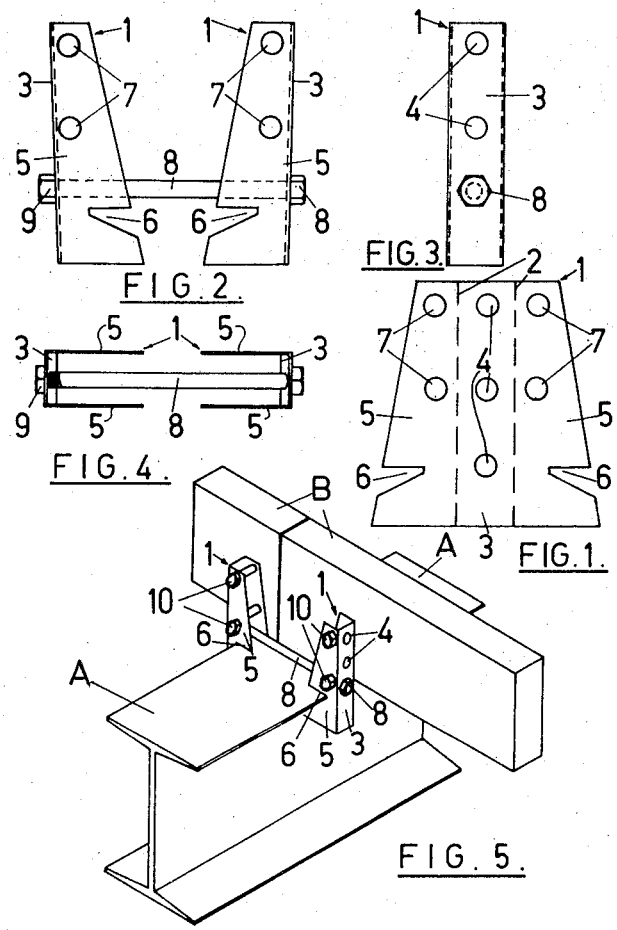
INVENTOR
ARTHUR RAYMOND TURNER
BY *Young & Thompson*
ATTORNEYS

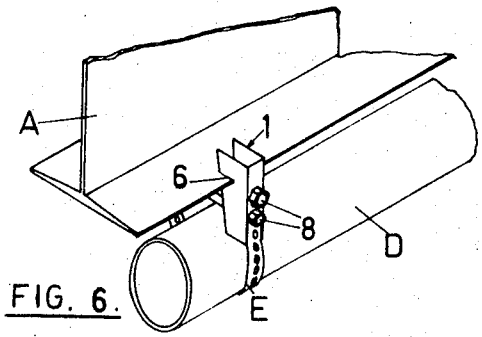
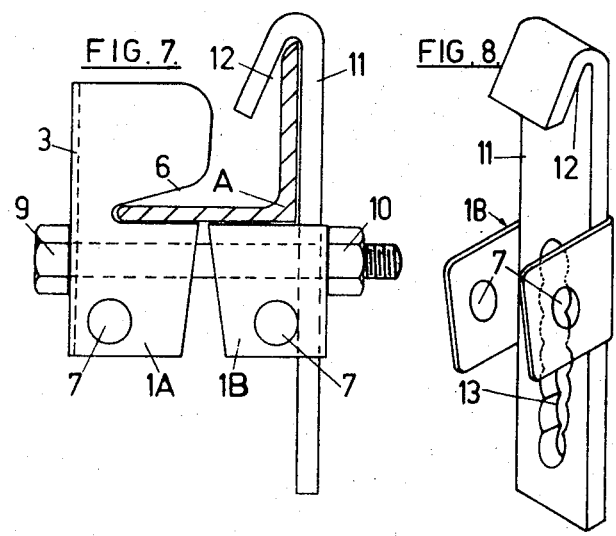

United States Patent Office 3,701,613
Patented Oct. 31, 1972

3,701,613
BUILDING FRAME BRACKETS
Arthur Raymond Turner, 69 Church Road, Taradale, Napier, New Zealand
Filed Sept. 14, 1970, Ser. No. 72,005
Claims priority, application New Zealand, Sept. 22, 1969, 157,287
Int. Cl. F16b 2/06
U.S. Cl. 287—189.36 C       1 Claim

ABSTRACT OF THE DISCLOSURE

A bracket for use in connecting or supporting metal and other members, the bracket characterised by being of a vertical elongated nature, having a lower open slot adapted for mounting on one side of one beam, a hole passing through the bracket above and in line with the depth of the open slot, and at least one further hole passing through the bracket at right angles to the axis of the first hole, whereby in conjunction with a similar opposite-handed bracket, each bracket may be mounted by its open slot on one edge of a first member, a bolt passed through the lower holes of the two brackets and secured by a nut screwed onto the bolt for clamping the brackets to the first member, at least a further bolt passed the further hole of each bracket and through a hole in a second member or members and secured by a nut to connect or link the members together.

---

This invention relates to brackets designed for use in building frames or construction, or for use in supporting members.

In steel frame buildings, especially industrial buildings, rolled steel joists, commonly known as "R.S.Js," are used for portals, etc. To fasten timber joists or beams to the rolled steel joists it becomes a problem as for each timber joist a steel lug has to be welded to the steel joist. Sometimes the steel lugs are not in line and this causes problems also as the welding is permanent and the purlins have to be placed and drilled in situ, usually in precarious situations. If a joint occurs both the steel and the timber joists have to be drilled. With the portals being twelve to fourteen feet part, usually all connections have to be joints as this is a good length for timber.

The present invention is concerned with a bracket for use in connecting or supporting metal and other members together, the bracket having such a construction that it may be secured to one member in any position along its length and then be connected to another member.

Generally the invention consists of a bracket for use in connecting or supporting metal and other members, the bracket characterised by being of a vertical elongated nature, having a lower open slot adapted for mounting on one side of one beam, a hole passing through the bracket above and in line with the depth of the open slot, and at least one further hole passing through the bracket at right angles to the axis of the first hole, whereby in conjunction with a similiar opposite-handed bracket, each bracket may be mounted by its open slot on one edge of a first member bolt passed through the lower holes of the two brackets and secured by a nut screwed onto the bolt for clamping the brackets to the first member, at least a further bolt passed the further hole of each bracket and through a hole in a second member or members and secured by a nut to connect or link the members together.

In further describing the invention, reference will be made hereinafter to the accompanying drawings in which:

FIG. 1 is a plan of a flat for producing the bracket 2,
FIG. 2 is a side view,
FIG. 3 is an end view and
FIG. 4 is a plan of an assembly incorporating two of the brackets;
FIG. 5 is a perspective view of two members or beams secured by two brackets,
FIG. 6 is a perspective view of a beam and a pipe attached by a bracket assembly;
FIGS. 7 and 8 are views showing another modification incorporating the bracket.

In giving effect to the invention, generally the bracket is formed out of steel steel or plate depending upon the size or load imposed on the joint. In a preferred embodiment, the bracket 1 is pressed out of steel sheet, such as 12 gage, and in the flat are provided two parallel bend lines 2 which define a central strip 13 within which are located a number of holes 4 (only three being shown in the drawings) one located inwards from one or the lower end of the sheet and further holes spaced along the central strip at distances from the first hole. The uppermost hole is located near the upper or other end of the strip. Nearer the first or lower end, each side or marginal portion 5 of the bracket is formed with a deep open slot 6. This slot is located towards the first or lower end of the bracket plate with an adjacent straight edge of each slot being on a common line which extends across the bracket plate clear of the first or lower hole. The other lower edge of each slot tapers inwards to give the respective slot an increasing width from a narrower inner closed end located well within the respective marginal strip 5 of the bracket flat pressing. Each marginal strip 5 is provided with a number of holes 7 (only two such holes being shown) preferably on similar axes to the upper holes 4 of the said central strip 3. This flat pressing is bent along its two bend lines 2 into the bracket 1 which is of U-shape or channel cross-section. The dimensions of the brackets 1 and number holes in the central strip 13 and the marginal portion 5 can of course be varied to suit different requirements.

For a member or beam A a bracket assembly of two of these brackets 1 is employed, one bracket being mounted by its open slot 6 on one edge of a flange of the beam and the other bracket similarly mounted on the other edge of the flange of the beam A. The open slot 6 in each marginal side strip 5 of the U-shaped bracket 1 tends to wedge onto the respective side edge of the beam's flange. A bolt 8 is passed through the lower aligning ones of the holes 4 in the central strips or backs of the brackets and a nut 9 is screwed onto the bolt. This draws the brackets 1 together and clamps the beam A between them.

Bolts 10 are passed through the aligning holes 7 in the sides 5 of the brackets 1 and through holes in another beam or timber purlin B and screwed by nuts (not shown) onto the ends of the bolts 10. This clamps the other beam or purlins B to the brackets 1 and so securely secures the other beam or purlins at right angles to the first beam A.

In FIG. 6 there is shown the beam A supporting a pipe D by means of a bracket assembly and a tightened perforated strap E.

In a modification the bracket is cut horizontally between the two upper ones of its holes 4 and between its two holes 7 providing two parts 1A and 1B. These two parts are arranged in opposition to one another as shown in FIG. 7 on the bolt 9. As shown in FIGS. 7 and 8 there is provided a separate strap 11 having its upper end portion bent around to be at an angle to the length of the strap providing a hooked end 12. This angle can be such as the conventional chamfer given a side edge of a beam A' of angle iron. Towards its other end, the strap 11 is provided with a series of holes 13 which are positioned on the longitudinal axis of the strap and at regular pitch. For instance the holes can be of ½" diameter and ½" pitch. This in effect provides a slot with half-round bays in its side edges. In some instances a normal slot can be provided, the slot being of a predetermined length depending upon the length of the strap.

The part 1B of the bracket is employed with this strap 11 as shown in FIG. 7. In this way a further bolt (not shown) can be passed through the hole 7 in one of the parts 1A, 1B, to be disposed at right angles to the bolt 10. The centres of the holes 13 in the strap 11 are made relative to the hooked end 12 of the strap so as to suit various sectional sizes of angle iron.

When the angle-iron beam A' is to be clamped, the hooked end 12 of the strap 11 is placed over one side edge of the angle iron and the open slot 6 of the bracket part 1A is positioned fitting over the other side edge of the angle iron. The bolt 8 is passed through the hole in the back of each opposed bracket part 1A and 1B and through the particular one of the holes 13 or slot in the strap 11 and the nut 9 screwed onto the free end of the nut. This pulls the two bracket parts 1A, 1B, and strap 11 very tightly together. The bolts 10 can be passed through the respective holes 7 in the two bracket parts 1A, 1B, and through holes in further beam A or B, or extra brackets clamped thereto to complete a metal to metal or metal to timber beam joint.

It is envisaged that one of the main applications for my improved bracket is in attaching steel or timber purlins to the brackets, before the purlins are positioned and so when the purlins are lifted into place, it is just a matter of fixing them to beam portals by insertion of the right length of bolt to the size. A further application is the use of the brackets to provide anchor points whereby members such as fluming, pipes, suspended ceilings and lighting can be hung from purlins or beams by straps in the manner as shown in FIG. 6. The advantage here is that the inherent adjustability of the brackets allows for easier and quicker positioning of the supported member in construction operations. The use of straps is not essential for supporting as articles or members can be attached directly to the brackets such as in the case of small suspended lifting assemblies. The brackets are also readily adapted to provide pick-up points on beams or rafters for the hook of a lifting device so making the lifting of beams in construction work much easier and convenient.

What is claimed is:

1. A bracket for securement to a flanged member, the bracket comprising a pair of identical sheet metal elements engageable with said flanged member on opposite sides of said flanged member, each of said elements being vertically elongated and comprising a flat upright web and a pair of flat upright parallel flanges extending from sad web toward said flanged member, said flanges having adjacent one end of each element wedge-shaped recesses therein for receiving in wedging relationship a flange of said flanged member, the bottoms of said recesses being spaced a substantial distance from said web, means on the other ends of said elements for securing said elements to a further member to interconnect said flanged member and said further member, nut and bolt means extending through said webs between said ends of said elements and having heads bearing against the opposite outer sides of said webs to tighten said elements against said flanged member, and an elongated flexible member secured at its ends to said other ends of said elements to encompass said further member.

References Cited

UNITED STATES PATENTS

| 495,783 | 4/1893 | Cavallaro | 287—20.94 |
| 3,561,717 | 2/1971 | Frederick | 248—228 |
| 982,965 | 1/1911 | Johnson | 248—228 |
| 1,384,437 | 7/1921 | Edelmann | 248—72 |
| 3,193,062 | 7/1965 | Pendleton | 287—189.35 |

DAVID J. WILLIAMOUSKY, Primary Examiner

W. L. SHEDD, Assistant Examiner

U.S. Cl. X.R.

287—20.94; 52—721